(12) United States Patent
Okubo

(10) Patent No.: US 7,212,105 B2
(45) Date of Patent: May 1, 2007

(54) TRANSMITTER FOR TIRE CONDITION MONITORING APPARATUS

(75) Inventor: Youichi Okubo, Gifu-ken (JP)

(73) Assignee: Pacific Industrial Co., Ltd. (JP)

( * ) Notice: Subject to any disclaimer, the term of this patent is extended or adjusted under 35 U.S.C. 154(b) by 114 days.

(21) Appl. No.: 10/802,189

(22) Filed: Mar. 17, 2004

(65) Prior Publication Data

US 2005/0078002 A1  Apr. 14, 2005

(30) Foreign Application Priority Data

Oct. 14, 2003 (JP) .............................. 2003-354108

(51) Int. Cl.
*B60C 23/00* (2006.01)
(52) U.S. Cl. .................... 340/447; 73/146.5; 340/442; 340/445
(58) Field of Classification Search ................ 340/442, 340/445, 447, 443; 73/146.5
See application file for complete search history.

(56) References Cited

U.S. PATENT DOCUMENTS

| 5,109,213 A |  | 4/1992 | Williams | 340/447 |
|---|---|---|---|---|
| 5,838,229 A | * | 11/1998 | Robinson, III | 340/442 |
| 6,112,585 A |  | 9/2000 | Schrottle et al. | 73/146 |
| 6,518,875 B2 | * | 2/2003 | DeZorzi | 340/442 |
| 6,570,462 B2 | * | 5/2003 | Edmonson et al. | 333/17.3 |
| 6,691,567 B2 | * | 2/2004 | Walker et al. | 73/146 |
| 6,963,274 B2 | * | 11/2005 | Saheki et al. | 340/447 |

FOREIGN PATENT DOCUMENTS

| DE | 37 03 128 A1 | 8/1988 |
|---|---|---|
| JP | 2001-174357 | 6/2001 |

* cited by examiner

*Primary Examiner*—Brent A. Swarthout
(74) *Attorney, Agent, or Firm*—Fish & Richardson P.C.

(57) ABSTRACT

A transmitter of a tire condition monitoring apparatus has an acceleration sensor, a transmission circuit, an antenna and a transmission controller. The transmitter is provided in a tire of a vehicle. The acceleration sensor detects a running state of the vehicle. The transmission circuit generates a transmission signal containing data representing a condition of the tire and outputs the transmission signal. The antenna wirelessly transmits the transmission signal. The transmission controller changes a transmission power of the transmission circuit according to a detection result of the running state detection device. This is capable of transmitting signals with an appropriate transmission power.

2 Claims, 2 Drawing Sheets

TRANSMITTER FOR TIRE CONDITION MONITORING APPARATUS

BACKGROUND OF THE INVENTION

The present invention relates to a transmitter of a tire condition monitoring apparatus. More particularly, the present invention pertains to a transmitter for a wireless tire condition monitoring apparatus that permits a driver in a vehicle passenger compartment to check conditions of tires, such as the air pressure.

Wireless tire condition monitoring apparatuses that allow a driver in a vehicle passenger compartment to check the conditions of vehicle tires have been proposed. For example, Japanese Laid-Open Patent Publication No. 2001-174357 discloses such an apparatus. The apparatus of the publication includes transmitters and a receiver. Each transmitter is located in the wheel of one of the tires and the receiver is located in the body frame of the vehicle. Each transmitter detects the conditions, such as air pressure and the temperature of the associated tire, and wirelessly transmits the detected information. The receiver receives data wirelessly transmitted by the transmitters with an antenna and displays the conditions of the tires, for example, on a display located in front of the driver's seat.

Each transmitter is accommodated in a case provided in the corresponding tire valve. The tire valve is fitted in a valve hole of the corresponding wheel. Accordingly, the case, which accommodates the transmitter, is located in the corresponding tire.

The wheels are formed of metal, such as aluminum and iron. Metal bead wire is embedded in sidewalls of each tire for reinforcing the tire. Thus, radio waves transmitted by the transmitters are attenuated by the wheels and the bead wire. As a result, the probability that the receiver receives data wirelessly transmitted by each transmitter, or the reception probability, is reduced.

SUMMARY OF THE INVENTION

Accordingly, it is an objective of the present invention to provide a tire condition monitoring apparatus that is capable of transmitting signals with an appropriate transmission power.

To attain the above object, the present invention provides a transmitter of a tire condition monitoring apparatus. The transmitter is provided in a tire of a vehicle. The transmitter has a running state detection device, a transmission circuit, an antenna and a controller. The running state detection device detects a running state of the vehicle. The transmission circuit generates a transmission signal containing data representing a condition of the tire and outputs the transmission signal. The antenna wirelessly transmits the transmission signal. The controller changes a transmission power of the transmission circuit according to a detection result of the running state detection device.

The present invention also provides a transmitter of a tire condition monitoring apparatus. The transmitter is attached to a vehicle wheel to be located inside a tire. The transmitter has a detection device, a transmission circuit, an antenna and a controller. The detection device detects that the transmitter is attached to the wheel. The transmission circuit generates a transmission signal containing data representing a condition of the tire and outputs the transmission signal. The antenna wirelessly transmits the transmission signal. The controller changes a transmission power of the transmission circuit according to a detection result of the detection device.

The present invention also provides a transmitter of a tire condition monitoring apparatus. The transmitter is provided in a tire of a vehicle and wirelessly transmits data representing a condition of the tire. The transmitter has a transmission circuit, an antenna and a controller. The transmission circuit generates a transmission signal containing data representing a condition of the tire and outputs the transmission signal. The antenna wirelessly transmits the transmission signal. The controller detects whether the antenna is detuned. The controller changes a transmission power of the transmission circuit according to a detection result.

The present invention also provides a method for controlling a transmission power. The method is applied to a transmitter of a tire condition monitoring apparatus. The transmitter is provided in a tire of a vehicle and includes a transmission circuit and an antenna. The transmission circuit generates a transmission signal containing data representing a condition of the tire and outputs the transmission signal. The antenna wirelessly transmits the transmission signal. The method including detecting a running state of the vehicle with a running state detection device; and changing a transmission power of the transmission circuit according to a detection result of the running state detection device.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Transmitters 30 of a tire condition monitoring apparatus 1 according to one embodiment will now be described with reference to the drawings. The apparatus 1 is used in a vehicle such as an automobile.

Figure 1:
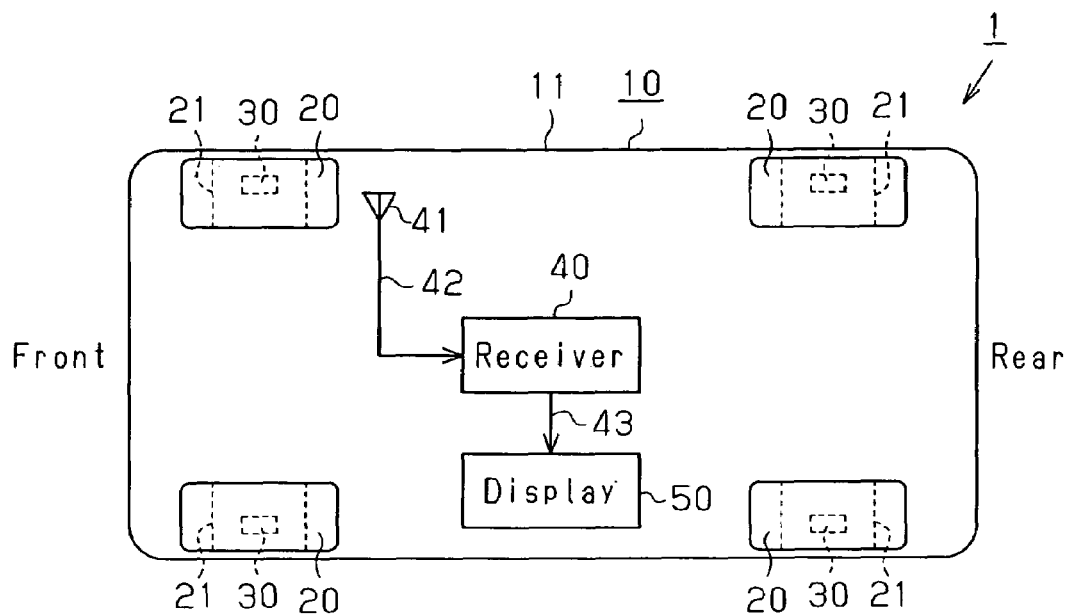
FIG. 1 is a block diagram showing a tire condition monitoring apparatus according to one embodiment of the present invention.

As shown in FIG. 1, the tire condition monitoring apparatus 1 includes the transmitters 30 and a receiver 40. The number of the transmitters 30 is four. Each transmitter 30 is located in one of the tires 20 of a vehicle 10. The receiver 40 is located on a body frame 11 of the vehicle 10.

Each transmitter 30 is located in the corresponding tire 20 and is fixed, for example, to a wheel 21 of the tire 20. Each transmitter 30 measures the condition of the corresponding tire 20, that is, the pressure of the tire 20. The transmitter 30 then wirelessly transmits data containing air pressure data.

The receiver 40 is located at a predetermined position on the body frame 11 and is activated by electricity of a battery (not shown) of the vehicle 10. A reception antenna 41 is connected to the receiver 40 with a cable 42. The receiver 40 receives data transmitted by the transmitters 30 through the reception antenna 41.

A display 50 is located in the view of the driver of the vehicle 10, for example, in the passenger compartment. The display 50 is connected to the receiver 40 with a cable 43.

Figure 2:
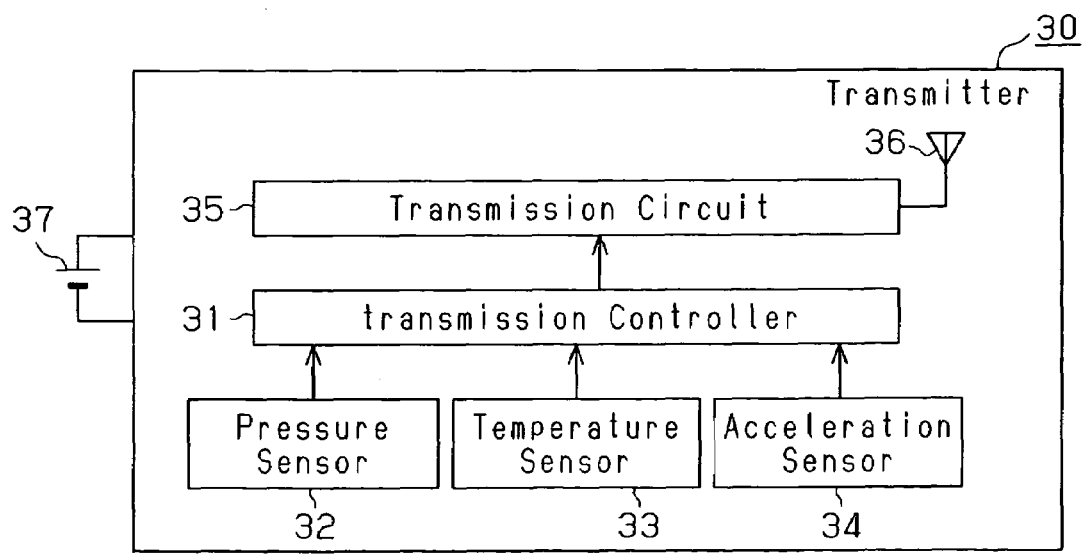
FIG. 2 is a block diagram showing one of the transmitters shown in FIG. 1.

As shown in FIG. 2, each transmitter 30 includes a transmission controller 31, which is a microcomputer. The controller 31 includes, for example, a central processing unit (CPU), a read only memory (ROM), and a random access memory (RAM). A unique ID code is registered in an internal memory, for example, the ROM, of the controller 31. The ID code is used to distinguish the associated transmitter 30 from the other three transmitters 30.

Each transmitter 30 includes a pressure sensor 32, a temperature sensor 33, and an acceleration sensor 34.

The tire pressure sensor 32 measures the air pressure in the interior of the associated tire 20 and provides the controller 31 with pressure data, which is obtained from the measurement. The temperature sensor 33 measures the temperature in the interior of the associated tire 20 and provides the transmission controller 31 with temperature data, which is obtained from the measurement. The acceleration sensor 34 detects a centrifugal acceleration that acts on the acceleration sensor 34 as the tire 20 rotates. The centrifugal acceleration is a parameter that correlates with the speed of the vehicle. Specifically, when detecting a centrifugal acceleration that is equal to or greater than a predetermined reference value, each acceleration sensor 34 outputs data representing the running state of the vehicle 10 to the transmission controller 31.

When the vehicle 10 moves, the tires 20 rotate. As each tire 20 rotates, the transmitter 30 attached to the wheel 21 of the corresponding tire 20, which applies acceleration to the associated acceleration sensor 34. When the vehicle 10 moves at a speed that is equal to or grater than a predetermined speed, centrifugal acceleration applied to each acceleration sensor 34 reaches the predetermined reference value. At this time, the acceleration sensor 34 sends data representing that the vehicle 10 is moving to the transmission controller 31.

Each transmission controller 31 sends the air pressure data, the temperature data, and the registered ID code to a transmission circuit 35. The transmission circuit 35 encodes and modulates the data sent from the transmission controller 31, thereby generating a transmission signal. The transmission antenna 36 transmits the transmission signal as a wireless radio wave. Each transmitter 30 is provided with a battery 37. The transmitter 30 is driven by electricity of the battery 37.

The transmission controller 31 of each transmitter 30 controls the pressure sensor 32 and the temperature sensor 33 to perform measurement at predetermined time intervals (for example, every fifteen seconds). Also, the transmission controller 31 controls the transmission circuit 35 to perform periodic transmission every time the pressure sensor 32 completes a predetermined number of (e.g., 4 cycles of) measurements. Further, when detecting an abnormality of the pressure in the tire 20 or of the temperature in the tire 20, the controller 31 causes the transmission circuit 35 to perform transmission irrespective of timing of the periodic transmission.

The timing of transmission of the transmitters 30 are regulated such that each transmitter 30 performs transmission at a timing different from those of the other transmitters 30. Therefore, two or more of the transmitters 30 do not perform transmission simultaneously.

An operation of each transmission controller 31 when the associated acceleration sensor 34 detects that the vehicle 10 is moving will now be described.

When each acceleration sensor 34 detects a centrifugal acceleration that is equal to or greater than the predetermined reference value, the acceleration sensor 34 outputs data representing the running state of the vehicle 10 to the transmission controller 31. Then, the transmission controller 31 determines that the transmitter 30 has been installed in the wheel 21 of a tire 20 and has started being used. The transmission controller 31 then a signal requesting a change in the transmission power to the transmission circuit 35. Accordingly, the transmission circuit 35 changes the transmission power (first transmission power) to a greater transmission power (second transmission power). As a result, the transmission power of the transmission circuit 35 is changed to a value greater than the current transmission power. In other words, the transmission controller 31 increases the transmission power of the transmission circuit 35 based on the start of use of the transmitter 30. Therefore, even if the radio waves transmitted by the transmitter 30 are attenuated by the metal wheel 21 and the bead wire, the data from the transmitter 30 is received by the receiver 40. Thus, the probability that the receiver receives data wirelessly transmitted by each transmitter, or the reception probability, is not reduced. Although each transmitter 30 is provided in the wheel 21 of the corresponding tire 20, data that is wirelessly transmitted by the transmitter 30 is received by the receiver 40.

Figure 3:
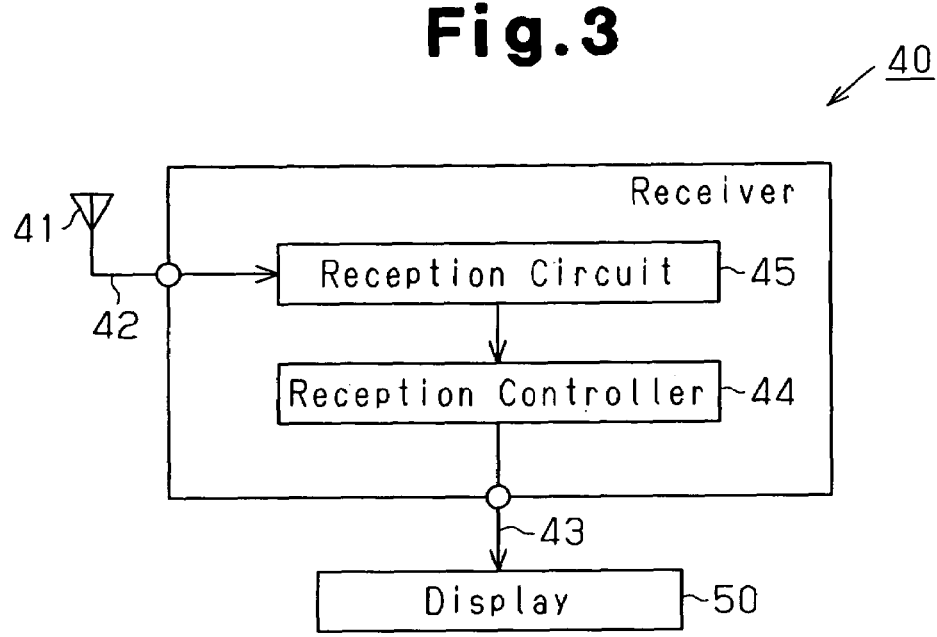
FIG. 3 is a block diagram showing a receiver.

As shown in FIG. 3, the receiver 40 includes a reception controller 44 and a reception circuit 45. The reception controller 44 processes data received with the reception antenna 41. The reception controller 44, which is, for example, a microcomputer, includes a CPU, a ROM, and a RAM. The reception circuit 45 receives data transmitted by the transmitters 30 through the reception antenna 41. The reception circuit 45 demodulates and decodes the received data and sends the data to the reception controller 44.

Based on the received data, the reception controller 44 obtains the internal pressure and the temperature of the tire 20 that are associated with the transmitter 30 that is the source of the received data. The reception controller 44 also causes the display 50 to show data regarding the air pressure and the temperature. Particularly, when there is an abnormality in the internal pressure or the temperature of the tire 20, the reception controller 44 displays warning on the display 50. The receiver 40 is activated when a key switch (not shown) of the vehicle 10 is turned on.

This embodiment has the following advantages.

(1) When receiving data representing that the vehicle 10 is moving from the corresponding acceleration sensor 34, each transmission controller 31 determines that the transmitter 30 is located in the wheel 21 of the associated tire 20 and that the use of the transmission 30 has been started. In other words, the transmission controller 31 determines whether the vehicle is moving based on a detection result of the acceleration sensor 34. When the vehicle is determined to be moving, the transmission controller 31 makes the transmission power of the transmission circuit 35 greater than the transmission power when the vehicle is determined not to be moving. Specifically, the transmission controller 31 then sends a signal requesting a change of the transmission power to the transmission circuit 35 so that the transmission power of the transmission controller 35 is changed from the current value (the first transmission power) to a greater transmission power (the second transmission power). This permits the transmitter 30 to transmit signals at the appropriate transmission power. As a result, even if the radio waves transmitted by the transmitter 30 are attenuated by the metal wheel 21 and the bead wire, the transmission signal from the transmitter 30 is received by the receiver 40. The probability that the receiver receives a transmission signal wirelessly transmitted by each transmitter 30, or the reception probability, is not reduced. Although each transmitter 30 is provided in the wheel 21 of the corresponding tire 20, a transmission signal that is wirelessly transmitted by the transmitter 30 is received by the receiver 40.

(2) When detecting an acceleration that is equal to or greater than a predetermined reference value, the acceleration sensor 34 outputs data representing the running state of the vehicle 10 to the transmission controller 31. Thus, only when the transmitter 30 is located in the wheel 21 of the associated tire 20 and the vehicle 10 is moving at a speed equal to or greater than the predetermined speed, the transmission controller 31 receives data representing the running state of the vehicle 10. In other words, when the transmitters 30 are being manufactured or being carried, the acceleration sensors 34 do not outputs data representing the running state of the vehicle 10 to the transmission controller 31. Misoperation of the transmitters 30 is therefore prevented.

It should be apparent to those skilled in the art that the present invention may be embodied in many other specific forms without departing from the spirit or scope of the invention. Particularly, it should be understood that the invention may be embodied in the following forms.

Each transmission controller 31 may determine whether the speed of the vehicle 10 is equal to or greater than a predetermined value based on a detection result of the associated acceleration sensor 34. In this case, the transmission controller 31 increases the transmission power of the transmission circuit 35 when the vehicle speed is equal to or greater than the reference value. Specifically, when the speed of the vehicle 10 is equal to or greater than the reference value, the transmission controller 31 changes the transmission power of the transmission circuit 35 from the current transmission power (the first transmission power) to a greater transmission power (the second transmission power). Alternatively, the illustrated embodiment may be modified that, when the speed of the vehicle is determined to be less than a reference value based on a detection result of the acceleration sensor 34, the transmission controller 31 changes the transmission power of the transmission circuit 35 to the first transmission power, which is smaller than the second transmission power. In this configuration, only when the vehicle 10 is moving at a speed that is equal to or greater than a predetermined value, the transmission controller 31 changes the transmission power of the transmission circuit 35 from the current transmission power (the first transmission power) to a greater transmission power (the second transmission power). In other words, the transmission controller 31 changes the transmission power of the transmission circuit 35 according to the speed of the vehicle 10. In this embodiment, the transmission controller 31 increases the transmission power of the transmission circuit 35 for a greater value of the speed of the vehicle. This reduces the power consumption of the battery 37. As a result, the life of the battery 37 is extended.

If each transmitter 30 is provided in the wheel 21 of the associated tire 20, the transmission antenna 36 is detuned by influence of the metal used in the wheel 21 and the bead wire in the tire 20. When the transmission antenna 36 is detuned, the transmission circuit 35, which includes a tuning circuit, is also detuned. This reduces the transmission power of the transmission circuit 35. Thus, the transmission controller 31 may be configured to change the transmission power of the transmission circuit 35 when the transmission antenna 36 is detuned. That is, when the transmission antenna 36 is detuned, the transmission controller 31 makes the transmission power of the transmission circuit 35 greater than the transmission power when the transmission antenna 36 is not detuned. In this configuration, the acceleration sensor 34 may be omitted.

Figure 4:
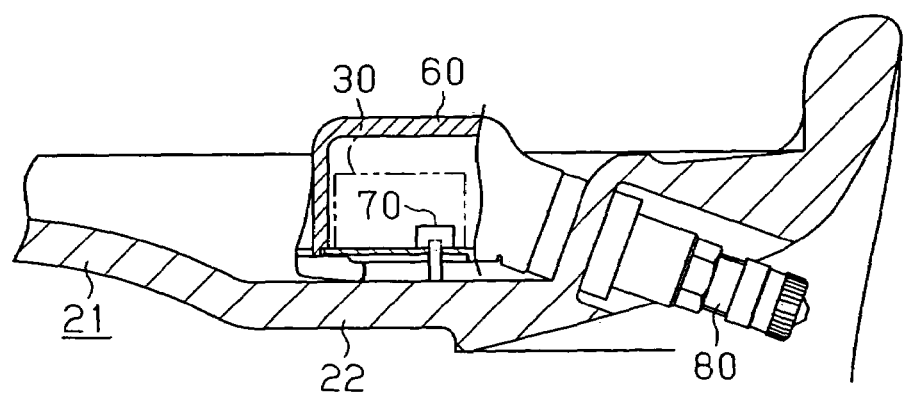
FIG. 4 is a cross-sectional view showing the transmitter attached to a wheel.

As shown in FIG. 4, a mechanical switch, for example, a push button switch 70, may be provided in the casing 60, which accommodates the transmitter 30. The push button switch 70 is switched to different states when the transmitter 30 is attached to the wheel 21 and when the transmitter 30 is detached from the wheel 21. Specifically, the push button switch 70 is provided such that the push button switch 70 is pressed by a drop center portion 22 of the wheel 21 when a tire valve 80 is attached to the wheel 21. When the push button switch 70 is pressed, the transmission controller 31 changes the transmission power of the transmission circuit 35. That is, when the transmitter 30 is attached to the wheel 21, the transmission controller 31 makes the transmission power of the transmission circuit 35 greater than the transmission power when the transmitter 30 is detached from the wheel 21.

The transmitter 30 shown in FIG. 2 may be provided with the push button switch 70 shown in FIG. 4. In this case, only when the push button switch 70 is pressed down, that is, when the transmitter 30 is attached to the wheel 21, the transmission power is switched based on a signal from the acceleration sensor 34. When the push button switch 70 is not pressed down, that is, when the transmitter 30 is not attached to the wheel 21, the transmission power is maintained to a low level (first transmission power).

The acceleration sensor 34 may be replaced by another type of detection means that converts the approach of metal into an electrical change. For example, a magnetoresistance (MR) element may be used. When metal approaches the element, the transmission controller 31 changes the transmission power of the transmission circuit 35 to an appropriate transmission power.

The transmission controller 31 may be configured to change the transmission power of the transmission circuit 35 to an appropriate transmission power based on whether metal approaches the element. This configuration also extends the life of the battery 37.

The acceleration sensor 34 may be replaced by other types of driving detection means such as a rotation sensor that detects rotation of the tire 20 and an angular acceleration sensor that detects an angular acceleration of the tire 20. These types of sensors are capable of detecting whether the vehicle 10 is moving. This modification has the same advantages as the illustrated embodiment.

To determine whether the vehicle 10 is moving, the reference value of the acceleration sensor 34 may be changed to a value that indicates that the vehicle 10 is not moving. For example, the reference value may be changed to zero.

When there is an abnormality in the pressure or the temperature of the tire 20, the abnormality may be indicated by a sound. In addition, a speaker that is mounted on the vehicle 10 in advance may be used as an informing device.

Air pressure data and temperature data transmitted by the transmitter 30 may indicate the values of the air pressure and the temperature or whether the air pressure and the temperature are within permissible ranges.

The temperature sensor 33 may be omitted. This reduces the costs of the transmitter 30 of the tire condition monitoring apparatus 1.

Other than four-wheeled vehicles, the present invention may be applied to two-wheeled vehicles, such as bicycles and motor cycles, multi-wheeled busses, multi-wheeled trailers and industrial vehicles having the tires 20 (for example, a forklift). When the present invention is applied to a trailer, the receiver 40 and the display 50 are provided in the tractor.

The present examples and embodiments are to be considered as illustrative and not restrictive and the invention is not to be limited to the details given herein, but may be modified within the scope and equivalence of the appended claims.

The invention claimed is:

1. A transmitter of a tire condition monitoring apparatus, wherein the transmitter is attached to a vehicle wheel to be located inside a tire, the transmitter comprising:
- a detection device for detecting that the transmitter is attached to the wheel;
- a transmission circuit, wherein the transmission circuit generates a transmission signal containing data representing a condition of the tire and outputs the transmission signal;
- an antenna for wirelessly transmitting the transmission signal; and
- a controller that changes a transmission power of the transmission power of the transmission circuit according to a detection result of the detection device;
- wherein the detection device is a mechanical switch that is pressed by the wheel when the transmitter is attached to the wheel so that the switch is switched to different states when the transmitter is attached to the wheel and when the transmitter is detached from the wheel.

2. The transmitter according to claim 1, wherein, when the transmitter is attached to the wheel, the controller makes the transmission power of the transmission circuit greater than the transmission power when the transmitter is detached from the wheel.

* * * * *